United States Patent [19]

Beer

[11] Patent Number: 4,641,809
[45] Date of Patent: Feb. 10, 1987

[54] MOTOR VEHICLE ENGINE MOUNTING ARRANGEMENT

[75] Inventor: Wilhelm Beer, Russelsheim, Fed. Rep. of Germany

[73] Assignee: General Motors Corporation, Detroit, Mich.

[21] Appl. No.: 792,191

[22] Filed: Oct. 28, 1985

[51] Int. Cl.$^4$ ............................................. F16M 13/00
[52] U.S. Cl. ...................................... 248/559; 180/300; 248/638; 248/659
[58] Field of Search .............. 248/559, 550, 659, 636, 248/562, 563, 638; 267/140.1, 80, 141.2, 141.3; 180/300; 188/282, 317, 322.15, 379, 380

[56] References Cited

U.S. PATENT DOCUMENTS

| | | | |
|---|---|---|---|
| 3,762,671 | 10/1973 | Schultz | 248/9 |
| 4,377,218 | 3/1983 | Fukushima | 248/559 X |
| 4,403,762 | 9/1983 | Cogswell | 248/559 |
| 4,440,375 | 4/1984 | Fukushima | 248/559 |
| 4,445,662 | 5/1984 | Fukushima | 248/659 X |
| 4,456,213 | 6/1984 | Fukushima | 248/559 |

FOREIGN PATENT DOCUMENTS 3008168  9/1981  Fed. Rep. of Germany ...... 180/300

*Primary Examiner*—J. Franklin Foss
*Attorney, Agent, or Firm*—R. L. Phillips

[57] ABSTRACT

A motor vehicle engine mount is disclosed comprising a core of a solid material placed between two parts made of elastomeric material, each of which is connected to a rigid outer part attached to the engine or the chassis. The core is determined to vibrate at a frequency corresponding to that of the engine and in a direction substantially counter to the vibration of the engine and is shaped relative to the outer parts such that a reduction occurs in the distance separating it from the outer parts in one of the vibration directions, leading to an increase in the spring rate of the mounting arrangement.

3 Claims, 5 Drawing Figures

4,641,809

MOTOR VEHICLE ENGINE MOUNTING ARRANGEMENT

TECHNICAL FIELD

The invention concerns a mounting arrangement, particularly for mounting an engine on the chassis of a motor vehicle, wherein the mounting arrangement consists of a rubber metal component.

BACKGROUND OF THE INVENTION

When a vehicle is subjected to irregularities in its path, e.g., transverse joints in the road, an impulse is transmitted through the chassis to the vehicle's drive train comprised of the engine and transmission. Since for acoustical reasons, the engine is supported on the chassis, i.e., on supports in the vehicle frame or on the unit body chassis, the engine is excited and begins to vibrate at its natural resonant frequency of approximately 7-10 Hz, depending on its harmonics. This low frequency sinusoidal vibration of the engine in turn causes the associated part of the vehicle to vibrate, which is detrimental to ride comfort and is particularly disadvantageous when several transverse joints are present at a distance such as to produce, at a particular vehicle speed, the frequency which corresponds to the natural frequency of the engine or the drive train.

Efforts have been made to suppress this low frequency vibration as quickly as possible by damping. This damping can be natural damping by means of the material in rubber metal engine mounts or external damping by means of shock absorbers or a special solution in the case of hydraulic mounts. Although damping does improve low frequency vibration behavior, it simultaneously worsens high frequency or audible range vibration behavior, so that this solution, particularly in the case of four-cylinder, in-line engines, cannot always be used.

SUMMARY OF THE INVENTION

The purpose of the invention is to create a mounting arrangement of the type just mentioned, wherein, in the presence of a force caused by an irregularity in the road and affecting the chassis, a counterforce is produced by means of which resonance of the engine is counteracted, so that feedback into the chassis is prevented. With the mounting arrangement according to the invention, it is therefore possible to undertake audible range tuning and tuning for vibration behavior independently. The mount represents an alternative to damping, in which a corresponding elastomer mixture can be selected for audible-range purposes. The mount is low in cost and not subject to abrasion.

According to the invention, this purpose is fulfilled by the provision of two parts made of an elastomeric material, each of which is attached to a rigid outer part connected to the engine or the chassis. A core consisting of a solid material is placed between the elastomeric parts that vibrates in step with the vibration frequency of the engine and substantially counter to the vibration of the engine and is shaped in relation to the outer parts in such a way that in one of the vibration directions a decrease in the distance between it and the outer parts occurs, accompanied by an increase in the spring rate of the mounting arrangement.

In this manner, the spring rate during stimulus from the road is altered so that sinusoidal vibration of the engine cannot occur.

It is preferable that the core be wedge-shaped, and the outer parts have oblique surfaces parallel to the wedge surfaces, so that the vibration of the core counteracts the vibration of the engine at the resonant frequency. One particularly advantageous realization results when the mounting arrangement consists of two sections lying side by side, each of whose outer parts have oppositely oriented oblique surfaces, and when the core has two sections connected to one another, whose wedge surfaces are also oriented oppositely and correspond to the oblique surfaces of the two halves.

The two outer portions and the core are therefore shaped in such a way that the core moves in a rotary direction in response to an axial force input. When the moment of inertia and rotational spring rate of the core are selected so that the natural rotational frequency of the core corresponds to the natural linear frequency of the engine, no sinusoidal vibration can occur, since because of the inertia of the core, the two systems vibrate oppositely and cancel one another out.

Moreover, on the core or on the two sections are placed inertia-adjusting flyweights, which advantageously are adjustable with respect to the core, so that their inertia can be changed. Besides this possibility for creating vibration of the core, the latter can also receive pulses from a mechanism by means of which it is excited or impelled at the frequency of the linear vibration in a direction opposite thereto. By means of the rotation of the core created in this manner, road motions or accelerations can be counteracted.

DESCRIPTION OF THE DRAWING OF THE PREFERRED EMBODIMENT

The preferred embodiment of the invention is illustrated in the accompanying drawing, in which:

FIG. 1 schematically shows a partial elevation of the installation of an engine on the chassis employing the mount according to the present invention in its preferred form.

Figure 1:
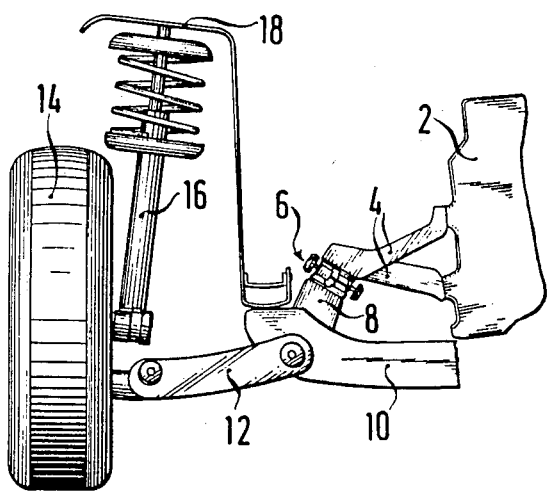

In FIG. 1, the engine 2, shown only in outline, which together with the transmission forms a drive unit, is supported on a bracket 4 on the mounting arrangement 6, which will hereafter be called an engine mount. The engine mount 6 is installed at or on a chassis part, in this case the mount boss 8 of a chassis cross member 10. Attached to the cross member 10 is a transverse link 12, which is connected to the bearing journals of the front wheel 14, which is supported on the chassis 18 by means of the shock absorber strut 16.

Figure 2:
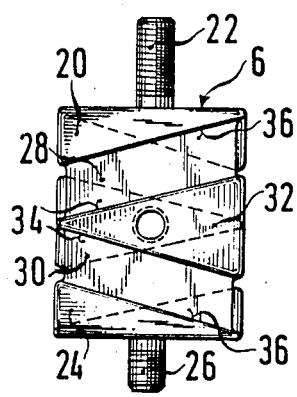
FIG. 2 is an enlarged side view of the engine mount in FIG. 1.

The engine mount 6 consists of the upper outer part 20, which is connected to the bracket 4 by means of the threaded bolt 22 and the lower outer part 24, whose threaded bolt 26 serves to connect it with the mount boss 8 on the cross member 10. The basic design of the engine mount 6 is best seen in FIG. 2. Attached to the outer parts 20 and 24 are the parts 28 and 30 made of elastomeric material such as natural or synthetic rubber, between which is the core 32, which is wedge-shaped. Running parallel to its oblique sides 34 are the inner surfaces 36 of the outer parts 20 and 26. The core's decay oscillation rate, specifically its amplitude, can be influenced by the particular wedge shape of the core 32, namely the angle formed by its oblique surfaces 34.

Figure 3:
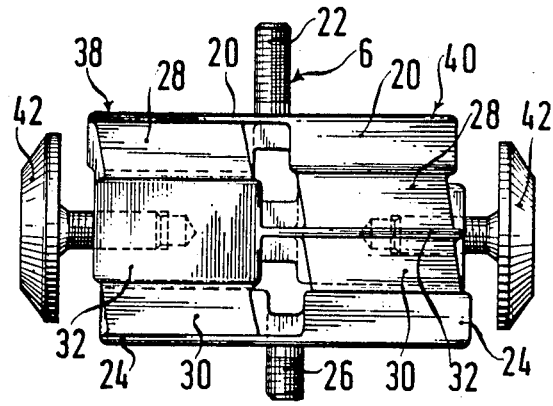
FIG. 3 is an enlarged elevational view of the engine mount in FIG. 1.

FIG. 3 shows that the engine mount 6 consists of two sections 38 and 40, which differ inasmuch as the wedge surfaces 34 and the oblique surfaces 36 are mirror images of one another. In FIG. 2, the wedge surfaces 34 and the oblique surfaces 36 of the section 38 are shown with dashed lines. While, as FIG. 3 shows, the outer parts 20 and 24 and the core 32 each form a single part for the two sections 38 and 40, the rubber parts 28 and 30 are separate parts for each section 38 and 40, although they can also be connected together at one point. FIG. 3 shows a slight deformation in the rubber parts 28 and 30 as a result of loading when the engine mount 6 is installed obliquely.

A weight 42 is attached to each side of the core 32. These weights 42 are secured by being screwed into the core 32, so that the moment of inertia can be adjusted by screwing them into a greater or lesser extent.

When a compressive axial force is applied to the engine mount 6, the core 32 moves in a rotary fashion, since because of the presence of the wedge surfaces 34 and the oblique surfaces 36, the core is pushed outward into each section 38 and 40 in opposite directions. By adjusting the moment of inertia of the core 32 by means of the weights 42 and by adjusting the rotational spring rate, it is possible to ensure that the core vibrates not in the direction of the axial vibration, but in the direction opposite thereto at the same frequency. This therefore means that when the outer parts 20 and 26 move or vibrate with respect to one another, the core, because of its inertia, lags behind this vibration. The two systems therefore vibrate oppositely, so that they cancel or damp one another.

The engine mount according to the invention, with adjustments which exploit the inertia of the core, can be designated a so-called passive engine mount, since no energy is required.

Figure 4:
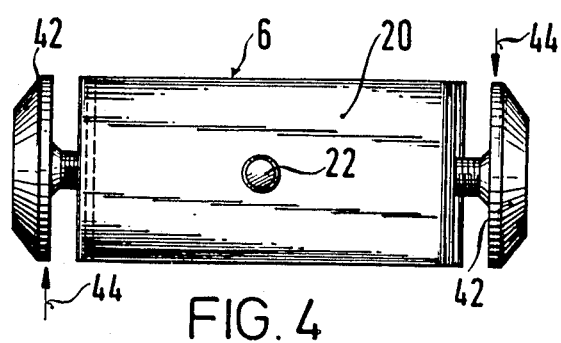
FIG. 4 is an enlarged plan view thereof.

If the inertia-adjusting weights 42 are omitted, and if in their place a mechanism is attached or incorporated which produces force impulses in the direction of the arrows 44 in FIG. 4 and thereby produces axial movements or accelerations by rotation of the core 32, road movements or accelerations can thereby be counteracted. In this process, the mass of the engine is exploited. If this mechanism, which can be mechanical, electrical or hydraulic, operates with the proper timing and in the proper direction, accelerations of the chassis can be reduced. The mechanism can consist, in a known manner, of sensors, servomotors and the like. This type of engine mount may be called active.

Figure 5:
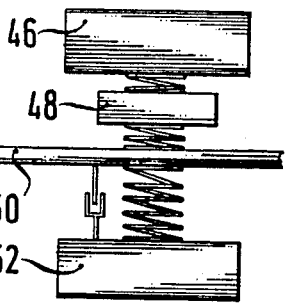
FIG. 5 is an operating diagram of the installation.

FIG. 5 shows an operating diagram in which the weight of the engine is labeled 46, and the engine mount is designated 48. Below the chassis 50 is the unsprung weight 52 which includes the wheel. When a stimulus is applied to the chassis 50 by the unsprung weight 52, the former is accelerated upwards. In order to damp this acceleration as much as possible, the servomotor receives a command from the sensors to move the mount 48, i.e., the core 32 in such a way that it counteracts the acceleration, utilizing the inertial mass of the engine. The existing slight damping effect of the elastomers is ignored in FIG. 5.

The mass of the core 32 can additionally be employed in the high frequency vibration region in order to improve audible-range behavior (cancellation function), since the inertia and the mass of the core can also be adjusted separately.

The above described preferred embodiment is illustrative of the invention which may be modified within the scope of the appended claims.

The embodiments of the invention in which an exclusive property or privilege is claimed are defined as follows:

1. A mounting arrangement for mounting an engine on a chassis of a motor vehicle comprising two rigid outer parts connected respectively to the engine and chassis, two parts of elastomeric material connected respectively to the rigid outer parts, a core of rigid material disposed between the elastomeric parts having a moment of inertia so as to vibrate at substantially the frequency of the engine but in a direction substantially counter to the engine vibration, and said core being shaped relative to the rigid outer parts so that in one of the directions of vibration thereof said core moves in a direction out from between said rigid outer parts to effect a decrease in the distance thereof from the rigid outer parts thereby effecting an increase in the spring rate of the mounting arrangement.

2. A mounting arrangement according to claim 1 wherein the core is wedge-shaped, and the rigid outer parts have inclined surfaces extending parallel to wedge surfaces of the core, and the moment of inertia of the core is determined so that the vibration thereof acts counter to that of the engine at the resonant frequency of the engine.

3. A mounting arrangement according to claim 1 or 2 wherein the core has two sections having wedge surfaces that are mirror images of one another, and the rigid outer member has two sections having oblique surfaces that are mirror images of one another and cooperate with the wedge surfaces on the core so as to produce rotary movement of the core in response to a compressive force applied to the mounting arrangement.

* * * * *